United States Patent
Nakamura et al.

(10) Patent No.: US 6,550,532 B1
(45) Date of Patent: Apr. 22, 2003

(54) FUEL EVAPORATOR

(75) Inventors: Masahito Nakamura, Saitama (JP); Yuuji Asano, Saitama (JP); Shiyuuichi Togasawa, Saitama (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 0 days.

(21) Appl. No.: 09/704,513

(22) Filed: Nov. 3, 2000

(30) Foreign Application Priority Data

Nov. 5, 1999 (JP) .......................................... 11-316002

(51) Int. Cl.$^7$ ............................... A23C 3/04; F02G 5/00
(52) U.S. Cl. ....................... 165/115; 165/911; 123/557
(58) Field of Search ................. 165/911, 900, 165/115; 123/557

(56) References Cited

U.S. PATENT DOCUMENTS

| | | | | |
|---|---|---|---|---|
| 2,219,522 A | * | 10/1940 | Hinsch | 123/558 |
| 2,306,897 A | * | 12/1942 | Ollig | 123/557 |
| 3,265,372 A | * | 8/1966 | Bradley | 261/30 |
| 3,961,616 A | * | 6/1976 | Brown | 123/557 |
| 4,196,157 A | * | 4/1980 | Schinner | 165/900 |
| 4,372,280 A | * | 2/1983 | Adams | 123/557 |
| 4,622,944 A | * | 11/1986 | Earl | 123/557 |
| 4,665,879 A | * | 5/1987 | Earl | 123/557 |
| 5,119,794 A | * | 6/1992 | Kushida et al. | 123/549 |

FOREIGN PATENT DOCUMENTS

| JP | 406034296 | * 2/1994 |
|---|---|---|
| JP | 2000-319002 | 11/2000 |

\* cited by examiner

*Primary Examiner*—Henry Bennett
*Assistant Examiner*—Tho V Duong
(74) *Attorney, Agent, or Firm*—Arent Fox Kintner Plotkin & Kahn, PLLC

(57) ABSTRACT

A fuel evaporator (1) includes an evaporation chamber (11) to prepare a fuel gas FG by evaporating a liquid fuel FL with heat, a fuel injector (40) to supply a liquid fuel to the evaporation chamber, a plurality of heating medium tubes (12) to lead a combustion gas HG through said evaporation chamber, a superheating part (11U) to heat a fuel gas FG evaporated in said evaporation chamber by means of the combustion gas HG, an exhaust duct (22) to exhaust the fuel gas FG, and a fuel injection tube (41). The fuel injection tube is provided with a plurality of injection holes (42), said fuel injection tube being extended into said evaporation chamber and said fuel injection tube is provided crossing at right angle with respect to a heating medium tube. Injection property of the fuel injection tube in said evaporation chamber is greatly improved. The liquid fuel is evaporated effectively and rapidly.

2 Claims, 6 Drawing Sheets

FUEL EVAPORATOR

BACKGROUND OF THE INVENTION

1. Field of the Invention

The present invention relates to a fuel evaporator for a fuel cell system. More particularly, the present invention relates to a fuel evaporator to heat and evaporate a raw liquid fuel.

2. Prior Art

In recent years, it has come to our notice that a fuel cell system FCS is a power generator that causes less contamination in global environment. The fuel cell system is a system to take out an electric energy produced by a chemical reaction from a fuel gas with oxygen. The fuel gas such as hydrogen is supplied to a fuel cell together with an oxidized gas containing oxygen to produce an electric energy.

However, as well known, it is not easy to store or treat hydrogen gas or liquefied hydrogen gas. For this reason, a modified gas is used as a fuel. The modified gas is prepared by evaporating a raw liquid fuel (hereinafter referred to only as liquid fuel) such as methanol by means of an evaporator.

The applicant of the present invention has disclosed a fuel evaporator to prepare a fuel gas by evaporating a liquid fuel in the unexamined patent application Hei 11-125366 in Japan. The fuel evaporator is explained in the accompanied drawing FIG. 1.

In FIG. 1 reference numeral 100 indicates an evaporator. The evaporator comprises an evaporation chamber 111 to evaporate the liquid fuel FL (indicated with reference letter FL in FIG. 1) by the heat of combustion gas HG (indicated with reference letter HG in FIG. 1) generated by a combustion apparatus (not shown) and a superheating chamber 130 which is located next to the evaporation chamber 111 to superheat the fuel gas FG (indicated with reference letter FG in FIG. 1) evaporated in said evaporation chamber 111. A combustion gas HG passage 113 is provided along the under surface of a bottom 111b of said evaporation chamber 111. The combustion gas passage 113 is communicated with said evaporation chamber 111 and said superheating chamber 130 to lead the gas passing said evaporation chamber 111 into said superheating chamber 130. The combustion gas HG fed into said superheating chamber 130 is applied to superheat the fuel gas FG in said superheating chamber 130.

There are provided in said evaporation chamber 111 a plurality of heating medium tubes 112, 112 . . . to supply highly heated combustion gas HG issued from the combustion apparatus (not shown) and a fuel injector 140 which injects the liquid fuel FL diffusively to a plurality of heating medium tubes 112, 112 . . .

Each of said heating medium tubes 112, 112 . . . substantially has a configuration of U tube. Each of Said heating medium tubes is arranged in lattice form with each other in upper and lower direction as well as in width direction in said evaporation chamber 111. An inlet 112A and an outlet 112B of the combustion gas HG of said heating medium tubes are provided on a wall surface 110B of said evaporation chamber 111.

There are provided a plurality of steam tubes 131, 131 . . . in the superheating chamber 130 to lead the fuel gas FG generated in said evaporation chamber 111.

The heated combustion gas FG introduced to the lower part of said superheating chamber 130 through a passage 113 is exhausted from the outlet located in the upper part of said superheating chamber 130. The combustion gas HG is heated by contact with the surface of the steam tubes 131, 131.

In the case of evaporation of the liquid fuel FL by means of the evaporator 100, said liquid fuel FL is injected from a fuel injector 140 to the heating medium tubes 112, 112 . . . Said liquid fuel FL injected from the fuel injector 140 is evaporated by contacting said heating medium tubes 112, 112 . . . and a bottom surface 111b and is introduced into the superheating chamber 130. The fuel gas FG is led into a modifier (not shown) after being superheated by the combustion gas HG in the superheating chamber 130. (Direction of fuel gas FG is indicated by reference arrow in the right side of FIG. 1.)

However, it has been pointed that to diffuse the liquid fuel FL equally in said evaporation chamber 111 is difficult because said heating medium tubes 112, 112 . . . are located separately from the injection holes of the fuel injector 140. Also, it is difficult to inject the liquid fuel FL effectively to an area where the heat is concentrated in said evaporation chamber 111. Thus, an evaporation efficiency of the liquid fuel FL is decreased and total efficiency of the system is accordingly decreased. Further, it has been pointed as a defect that an output shortage is generated when load of the fuel cell system is increased.

Further, a liquid reservoir is sometimes generated when the liquid fuel is injected apart from a heat concentrated part in the evaporation chamber 111 and the liquid fuel is retained on the wall or the bottom of said evaporation chamber 111 in liquefied state. When a liquid film is created from such liquefied state, the liquid film decreases the heat receiving area in comparison with liquid dropping condition and it becomes difficult to evaporate the liquid fuel. In these cases, an excess fuel gas gradually evaporated from the liquid reservoir is naturally supplied to the fuel cell system, and even if amount of the liquid fuel to be supplied is decreased as the load of the fuel cell system is decreased, it becomes difficult to control the amount of the fuel gas to be exactly supplied. Accordingly, the responsibility of the fuel cell system to output variation becomes worse.

Further, because of construction provided with the superheating chamber in the latter step of the evaporation chamber the passages of the combustion gas becomes complicated. Such complicated combustion gas passages decrease heat efficiency of the combustion gas as the heat is deprived outside the apparatus. It goes without saying that the heat efficiency of the combustion gas becomes poor.

SUMMARY OF THE INVENTION

The present invention has been made with the foregoing background in mind. The object of the present invention is to offer a fuel evaporator to evaporate the liquid fuel efficiently and rapidly by improving an injection property of the liquid fuel in the evaporator.

It is also an object of the present invention to offer an excellent evaporator in heating efficiency of the combustion gas in a simple construction.

The present invention, in order to solve the aforementioned problem, comprises an evaporation chamber to prepare a fuel gas by evaporating said liquid fuel with a heating medium of high temperature, a fuel injector to supply said liquid fuel to an evaporation chamber, said liquid fuel being passed through the evaporation chamber, a plurality of heating medium tubes through which the heat medium of high temperature is passed, and an exhaust port, through which the fuel gas being exhausted. The fuel injector is provided at the side of the evaporation chamber. The fuel injector is also provided with fuel injection tubes extending into the evaporation chamber and the fuel injection tubes are provided with a plurality of injection holes.

According to the aforementioned composition it has become possible to inject the liquid fuel equally into the evaporation chamber through the plurality of the injection holes provided on the fuel injection tubes extended into the evaporation chamber. It has become possible to evaporate the liquid fuel efficiently and rapidly.

The fuel injection tubes are arranged to cross at right angle with respect to the heating medium tubes. With this arrangement the liquid gas is diffused equally to the areas of substantially same temperature. Thus heat efficiency is improved and the liquid fuel is rapidly evaporated.

Particularly, in the case of the heat medium tubes having a bellows shape are applied, the liquid fuel contacts vertical surfaces of the bellows and the liquid fuel is effectively evaporated.

In the above composition it is preferred to provide injectors having larger diameter and numerous holes in the vicinity of central part of the fuel injection tubes than the side part near the wall of the evaporation chamber.

With such composition of fuel injection tubes much amounts of the liquid fuel are injected to the central area of the evaporation chamber where the heat is concentrated.

Further, with the aforementioned composition, it is preferable to have a superheat part in the evaporation chamber and yet the heating medium tubes are applied in such a superheat part.

With the aforementioned composition the present invention has offered a highly heat efficient evaporator so as to evaporate the liquid fuel effectively and rapidly.

Further, in such an aforementioned composition it is recommended to apply a catalyst combustion apparatus. If the catalyst combustion apparatus is provided at lower part of the evaporation chamber, the heat to be diffused in the circumstance is effected as a heating source of evaporation chamber. Thus heating efficiency is improved and the liquid fuel is evaporated efficiently and rapidly.

BRIEF EXPLANATION OF THE DRAWINGS

FIG. 5-B is an expanded cross section of a fuel injector of the other preferred embodiment according to the present invention.

FIG. 5-C is an expanded cross section of a fuel injector of another preferred embodiment according to the present invention.

DETAILED EXPLANATION OF THE PREFERRED EMBODIMENT OF THE INVENTION

Now an example of fuel evaporator according to the present invention is explained with reference to the accompanying drawings.

Figure 1:
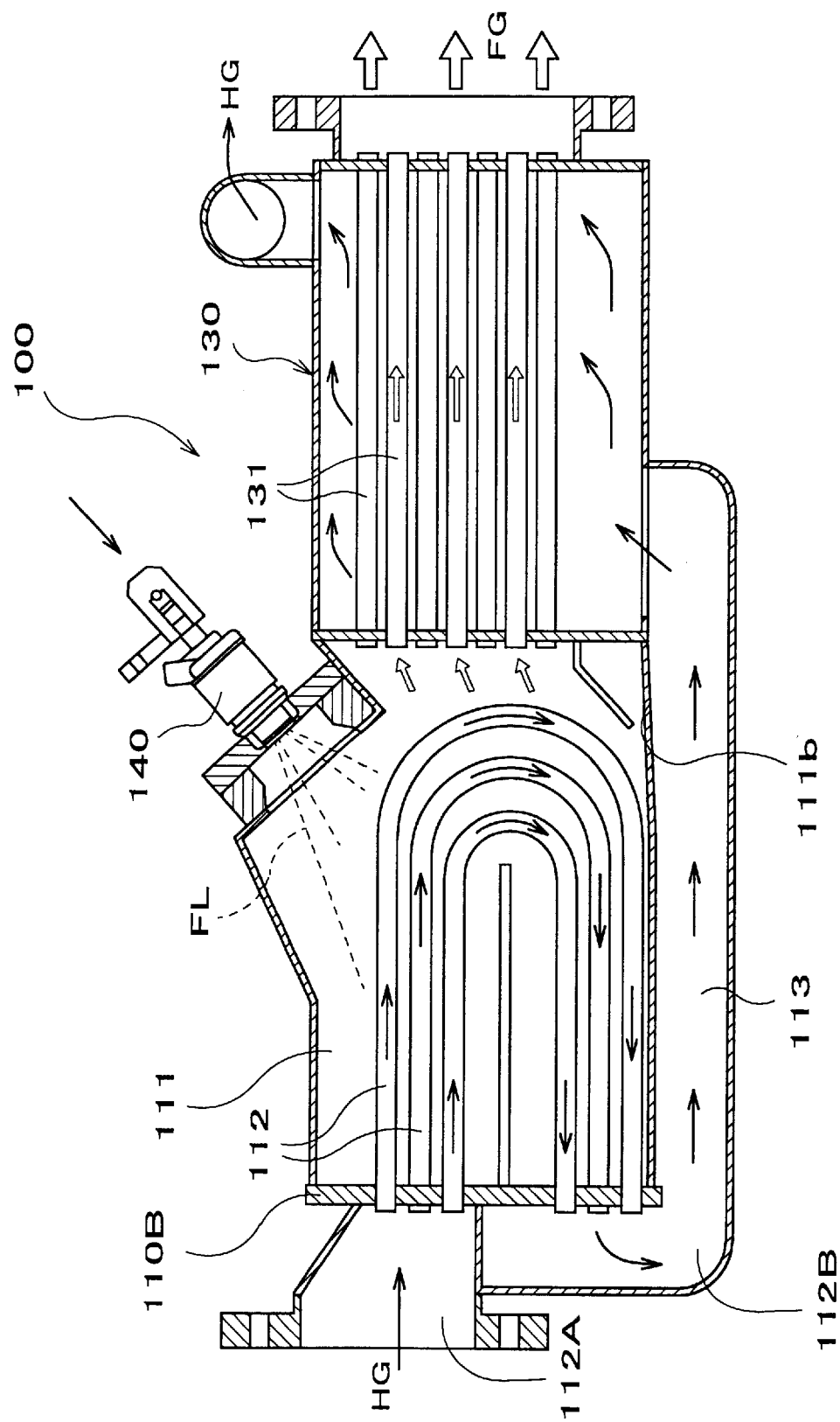
FIG. 1 is a cross section of a conventional fuel evaporator.
Figure 2:
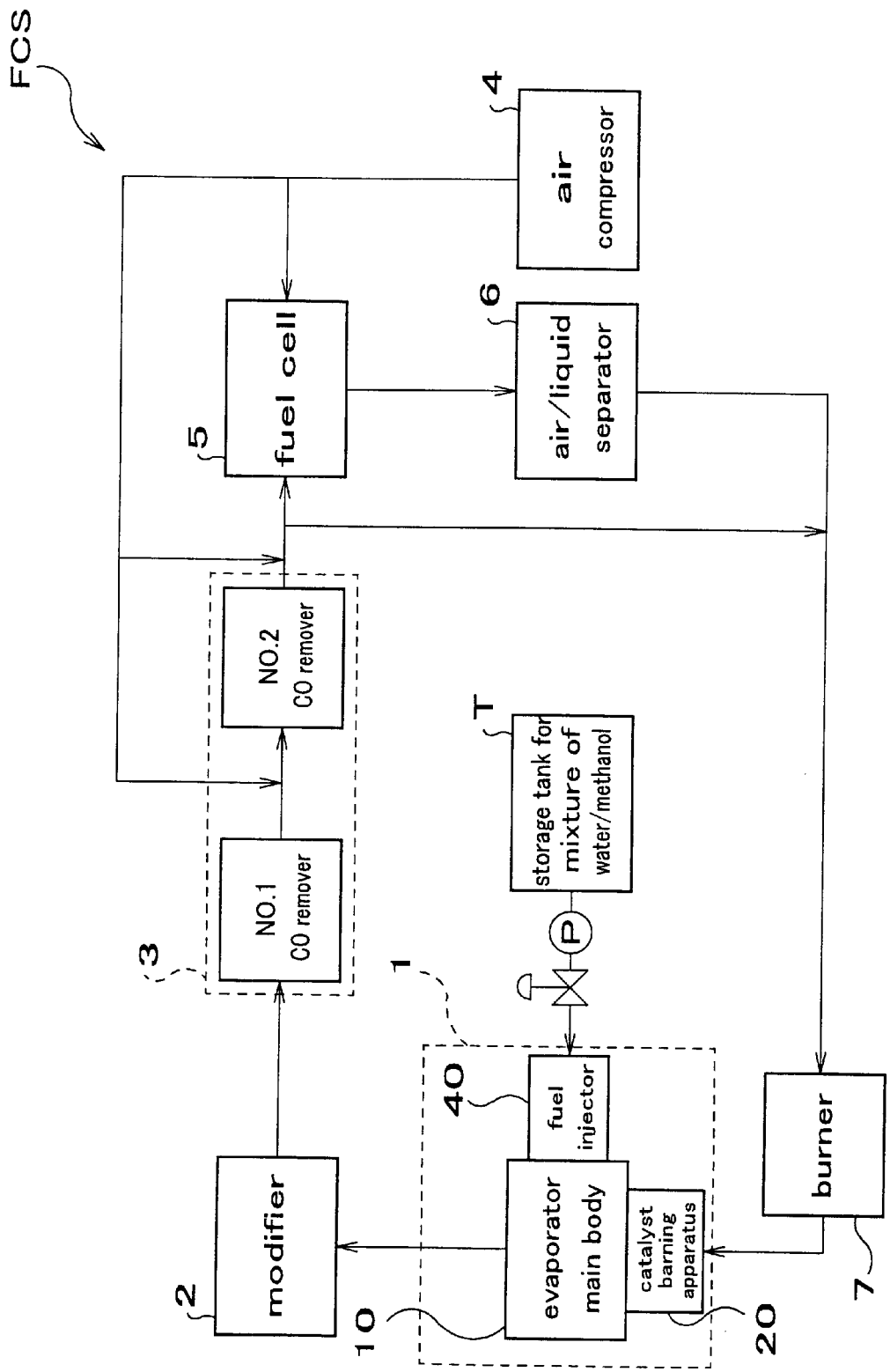
FIG. 2 is an outline of a fuel cell system applying a fuel evaporator according to the present invention.
Figure 3:
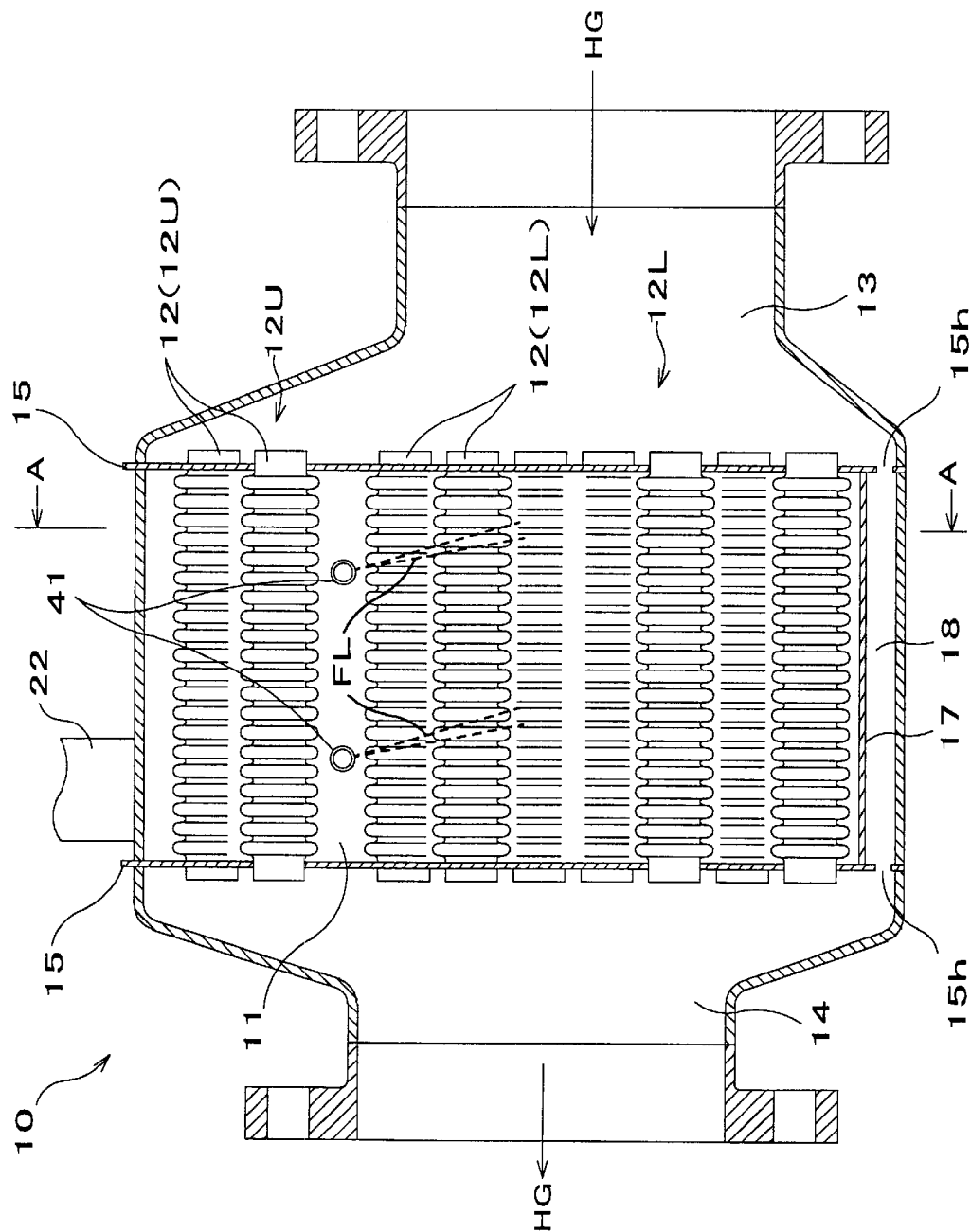
FIG. 3 is a cross section of a fuel evaporator according to the present invention.
Figure 4:
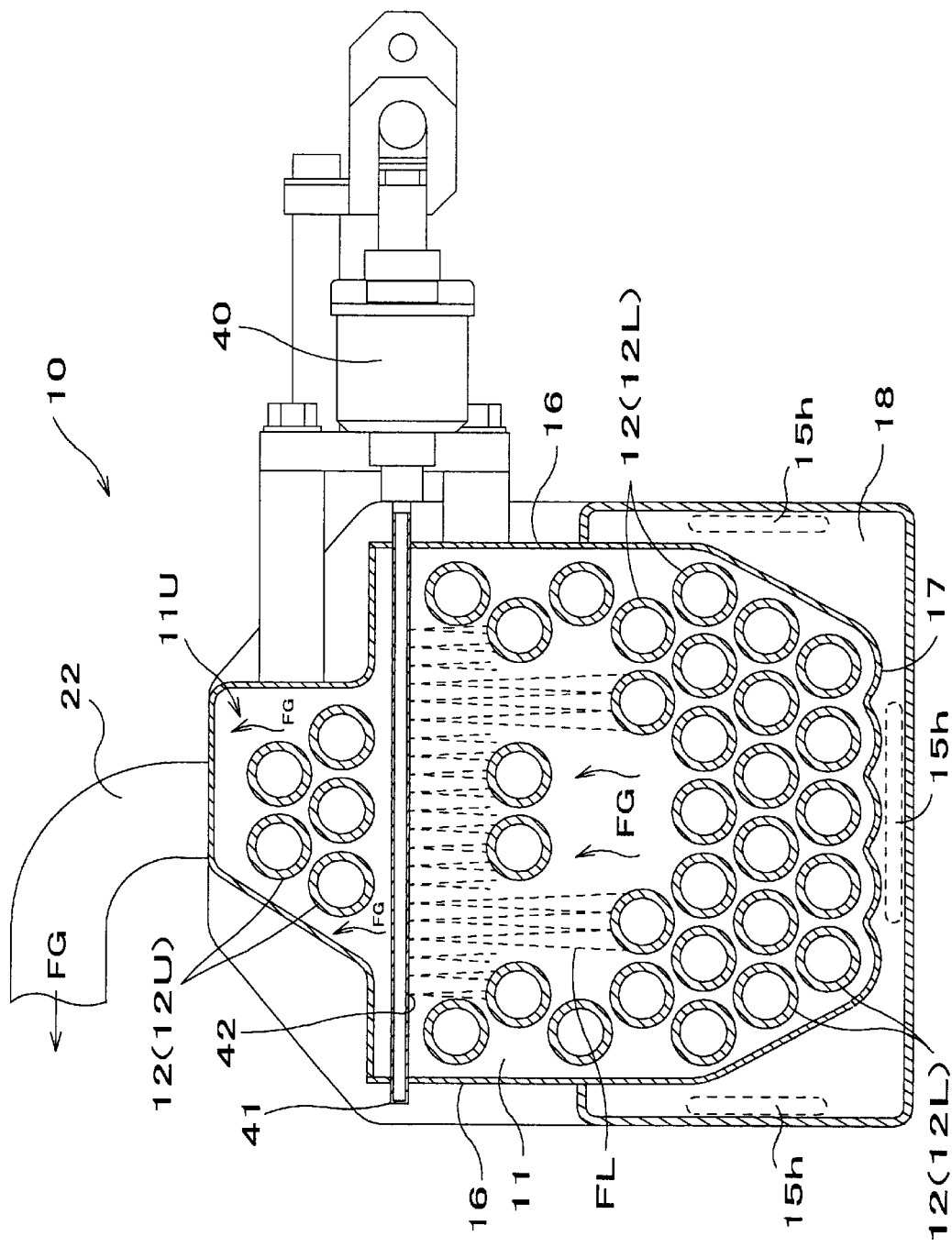
FIG. 4 is a cross section taken along A—A line in FIG. 3.

FIG. 2 is an outline of a fuel cell system applying a fuel evaporator according to the present invention. FIG. 3 is a cross section of a fuel evaporator according to the present invention. FIG. 4 is a cross section taken along A—A line in FIG. 3.

Reference code FCS indicates a fuel cell system. The fuel cell system comprises such that, as shown in FIG. 2, a fuel evaporator 1 to evaporate the liquid fuel which is a mixture of water and methanol supplied from a storage tank T by means of a transfer pump, a modifier 2 to modify the fuel gas with the aid of a reaction of a solid catalyst, a CO remover 3 provided to remove CO gas contained in modified gas exhausted from the modifier 2, said CO remover being comprised with No.1 and No.2 removers, a fuel gas acting as a high temperature heating medium containing hydrogen exhausted from the CO remover 3, and a fuel cell 5 to generate an electric power from said fuel gas and oxygen gas containing oxygen compressed by an air compressor 4. Said fuel cell system further comprises an air/liquid separating apparatus 6 to remove water from off gas exhausted from hydrogen pole of the fuel cell 5 and a combustion burner 7 to act when the fuel cell system is started. It is common to apply water and methanol as a liquid fuel. It is also recommended to apply ethanol or other alcoholic liquid, or the like, or kerosene, in place of methanol.

Further, the fuel evaporator 1 comprises an evaporator body 10 to evaporate a liquid fuel FL, a fuel injector 40 to supply the liquid fuel to the evaporator body 10 and a catalyst combustion apparatus 20 to keep the combustion gas obtained in higher temperature condition after the combustion gas HG being burnt by the catalyst.

The evaporator body 10 indicates a characteristic composition according to the present invention, as shown in FIG. 3 and FIG. 4, comprises an inlet passage 13 to lead a heated combustion gas HG generated in the catalyst combustion apparatus 20 and an outlet passage 14 to exhaust the combustion gas HG after the liquid fuel FL is evaporated. There is provided an evaporation chamber 11 partitioned by walls 15, 15, sides 16, 16 and a bottom surface 17 between the inlet passage 13 and the outlet passage 14. Heating medium tubes 12, 12 . . . are supported through the evaporation chamber 11 to introduce the combustion gas HG.

FIG. 4 shows an outside passage 18 provided to lead the combustion gas HG along the sides 16, 16 and the bottom surface 17 of the evaporation chamber 11. Reference numeral 15h, 15h, 15h shown by temporary line in FIG. 4 indicate a plurality of communication holes provided on the sides 15, 15 to lead the combustion gas HG to an outside passage 18.

There are provided fuel injection tubes 41 and 41 in the evaporation chamber 11. Said fuel injection tubes 41 and 41 are extended into the evaporation chamber 11 and are communicated with the fuel injector 40 provided on the sides 16, 16 of the evaporator 11. Said fuel injection tubes 41 and 41 are provided with a plurality of injection holes 42, 42 . . . Said fuel injection tubes 41 and 41 are supported along the sides 16 and 16 in the evaporation chamber 11. Said fuel injection tubes 41 and 41 are provided crossing at right angle with respect to the heating medium tubes 12, 12 . . . There is also provided an exhaust duct 22 above the evaporation chamber 11 to exhaust the fuel gas FG to the modifier 2 after the liquid fuel FL was evaporated. The exhaust duct 22 can be provided on either side of the side 16 of the evaporation chamber 11. The location of the exhaust duct 22 is effective to control the height of the evaporator body 10.

The heating medium tubes 12, 12, . . . , as shown in FIG. 4, are provided in lattice form with some displaced positions each other in the upper and lower direction and width direction of the evaporation chamber 11. The heating medium tubes 12, 12 located upper and lower part of the fuel injectors 41 and 41 are hereinafter referred to as 12U, 12U . . . and 12L, 12L, . . . , respectively.

A superheating part 11U is formed above the evaporation chamber 11 with upper heating medium tubes 12U, 12U . . . as shown in FIG. 4. The fuel gas FG is superheated just before being exhausted from the exhaust duct 22 and is condensed above the evaporation chamber 11 and in the exhaust duct 22. Thus liquefaction is again prevented. This process is the same superheating chamber 120 already disclosed in prior art. However, the superheating chamber is not disclosed in the specification of the present invention, thus the construction of the apparatus is simple. According to the present invention the combustion gas passage is shortened, thus heat efficiency of the combustion gas HG is improved.

The lower heating medium tubes 12L, 12L . . . are provided to generate the fuel gas by evaporating the liquid fuel FL injected from the fuel injection tubes 41 with the heat of the combustion gas HG passing through said lower heating medium tubes 12L, 12L.

The lower heating medium tubes 12L, 12L . . . is located to cover the sides 16, 16 and the bottom surface 17 of the evaporation chamber 11 so that the amount of the liquid fuel FL fitted and retained to the sides 16, 16 and the bottom 17 of the evaporation chamber 11 might be kept minimum. By this construction, heat concentrated part is formed in the vicinity of the central part of the evaporation chamber 11.

Degree of temperature of the evaporated fuel gas FG depends upon the composition of the liquid fuel FL injected and the temperature of the combustion gas HG. However, it is observed that the temperature reaches the degree of between 120° C. and 150° C. in the lower part of the fuel injection tubes 41 and 41. The fuel gas FG reaches the degree between 180° C. and 250° C. by being superheated with the upper heating medium tubes 12 U, 12 U. With such superheating process the fuel gas FG is introduced to the modifier 2 (not shown) without being liquefied again.

Configuration of the heating medium tubes 12, 12, . . . is of bellows type as shown in FIG. 3. The tubes of bellows configuration can absorb thermal deformation much easier in comparison with the tubes of straight configuration even if higher combustion gas HG is introduced in the gas tubes. Further, tubes of bellows configuration can stir the flow of combustion gas by their dent and projection configuration. This will assist unity of degree of temperature of the combustion gas HG. The bellows configuration exactly increases the convection heating surface of the heating medium tubes 12, 12, . . . to the liquid fuel FL.

It is preferable that the material of the heating medium tubes 12, 12, . . . is made of stainless steel such as, e.g. SUS 316. Said stainless steel can give a corrosion resistance to the tubes even if a mixture of water and methanol is injected.

The outer passage 18 is provided to rapidly evaporate the drops of the liquid fuel FL reached the sides 16 and 16, and the bottom surface 17 in the evaporation chamber 11 with the heat of the heating medium passing through said outer passage 18.

It is preferable that a ratio between the total of the inside diameters of the lower heating medium tubes 12L, 12L, . . . and a cross section of the outer passage 18 is retained between 6:4 and 8:2. In case total area of the inside diameter of the lower heating medium tubes 12L, 12L, . . . is lower than the area of above mentioned ratio, it is observed that liquid drops to the side 16, 16 and the bottom surface 17 are increased. In contrast the total area of the inside diameter of the lower heating medium tubes 12L, 12L becomes larger than the area of the above mentioned ratio. When the above-mentioned ratio is not observed, the balance between the amount of the liquid fuel to be fed and to be evaporated is not made.

Figure 5:
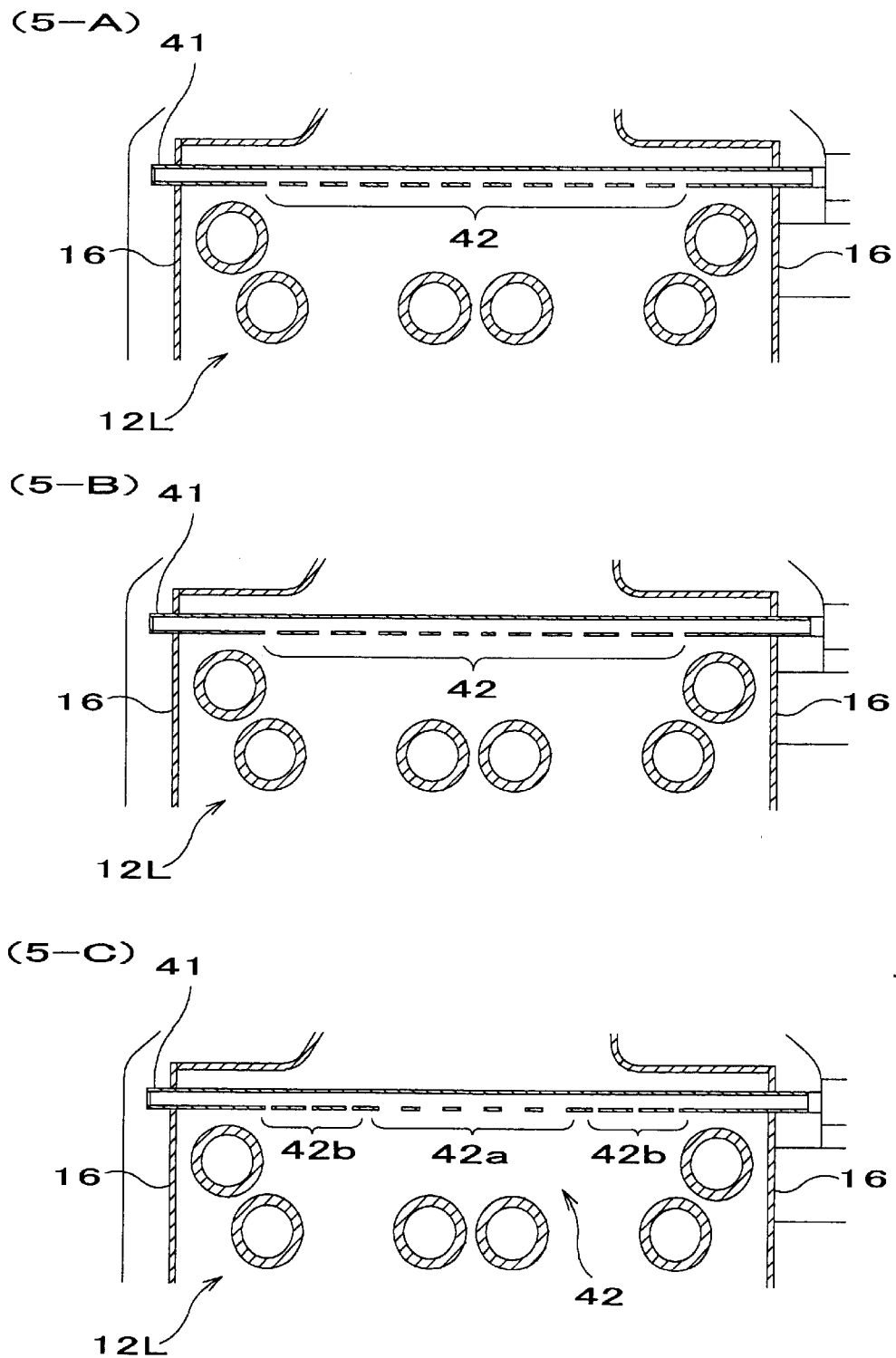
FIG. 5-A is an expanded cross section of a fuel injector in the preferred embodiment according to the present invention.

As shown in FIG. 5-A, the fuel injection tubes 41 and 41 are communicated to the fuel injector 40. Said fuel injection tubes inject an appropriate amount of the liquid fuel to the evaporation chamber 11 at a predetermined time with the signals issued from the control part (not shown). A plurality of injection holes 42, 42, . . . of the same inside diameters are provided with the same distance.

There are provided two fuel injection tubes 41 and 41 along the lower heating medium tubes 12L, 12L, . . . so as to cross at right angle with respect to said lower heating medium tubes 12L, 12L, . . .

The temperature of the combustion gas HG is higher at the inlet passage 13 than the outlet passage 14. The temperature of the lower heating medium tubes 12L, 12L, . . . also have temperature distribution between the inlet passage 13 and the outlet passage 14. The fuel injection tubes 41 and 41 cross at right angle with respect to the lower heating medium tubes 12L, 12L, . . . Accordingly, liquid fuel FG is equally distributed in the longitudinal direction of the lower heating medium tubes 12L. In other words, the liquid fuel FG is equally injected to the same temperature area. Thus the liquid fuel FL is rapidly evaporated.

It is also noted that each injection hole of the injection holes 42, 42 are provided with an appropriate inclination toward the inlet passage 13 from the fuel injection tube 41 and 41, respectively.

Next, the order to evaporate the liquid fuel by the fuel evaporator 1 is explained.

In the aspect of preparation, a mixture of air and methanol is fed to a catalyst combustion apparatus 20. The heat generated in the catalyst burning process warms the fuel evaporator 1.

After such warming is over, a control valve (not shown) of the fuel injector 40 is opened. The liquid fuel FL supplied into the fuel injection tubes 41, 41 is injected toward the inlet passage 13 of the lower heating medium tubes 12L, 12L, . . . , as shown by the broken lines in FIG. 4, through a plurality of injection holes 42, 42, . . . of the fuel injection tubes 41 and 41.

A part of the injected liquid fuel is evaporated with the heat in the evaporation chamber 11. In the meantime, most of the injected liquid fuel are evaporated from the surface of the lower heating medium tubes 12L, 12L, . . . Some of the injected liquid fuel FL drop out from the surface of the lower heating medium tubes 12L, 12L, . . . , but they are evaporated from the surface of another heating medium tubes situated downward. Another injected liquid fuel FL flown in all directions are also evaporated from the surface of another heating medium tubes located in circumference of the evaporation chamber 11.

The fuel gas FG evaporated from the surface of the lower heating medium tubes 12L, 12L, . . . go upward and are superheated by means of the upper heating medium tubes 12U, 12U, . . . located above the evaporation chamber 11. The evaporated fuel gas is exhausted from an exhaust duct 22 and introduced into the modifier 2 (not shown). The fuel injection tubes 41 and 41 are, as shown in FIG. 4 and FIG. 5-A, are extended toward the width direction in the evaporation chamber 11. Said fuel injection tubes have a plurality of injection holes 42, 42, . . . so as to inject the required amounts of the liquid fuel FL directly to the heat concentrated part in the evaporation chamber 11.

Unlike the case that the liquid fuel FL is diffusively injected from the location separated from the location where the heat is concentrated which is disclosed in prior art, the required amounts of the liquid fuel FL is directly injected toward the heat concentrated part of the evaporation chamber 11. The liquid fuel FL is evaporated effectively and rapidly. It is possible to provide a desired number of injection holes, though 11 injection holes 42, 42, . . . are provided in FIG. 5-A.

Figure 6:
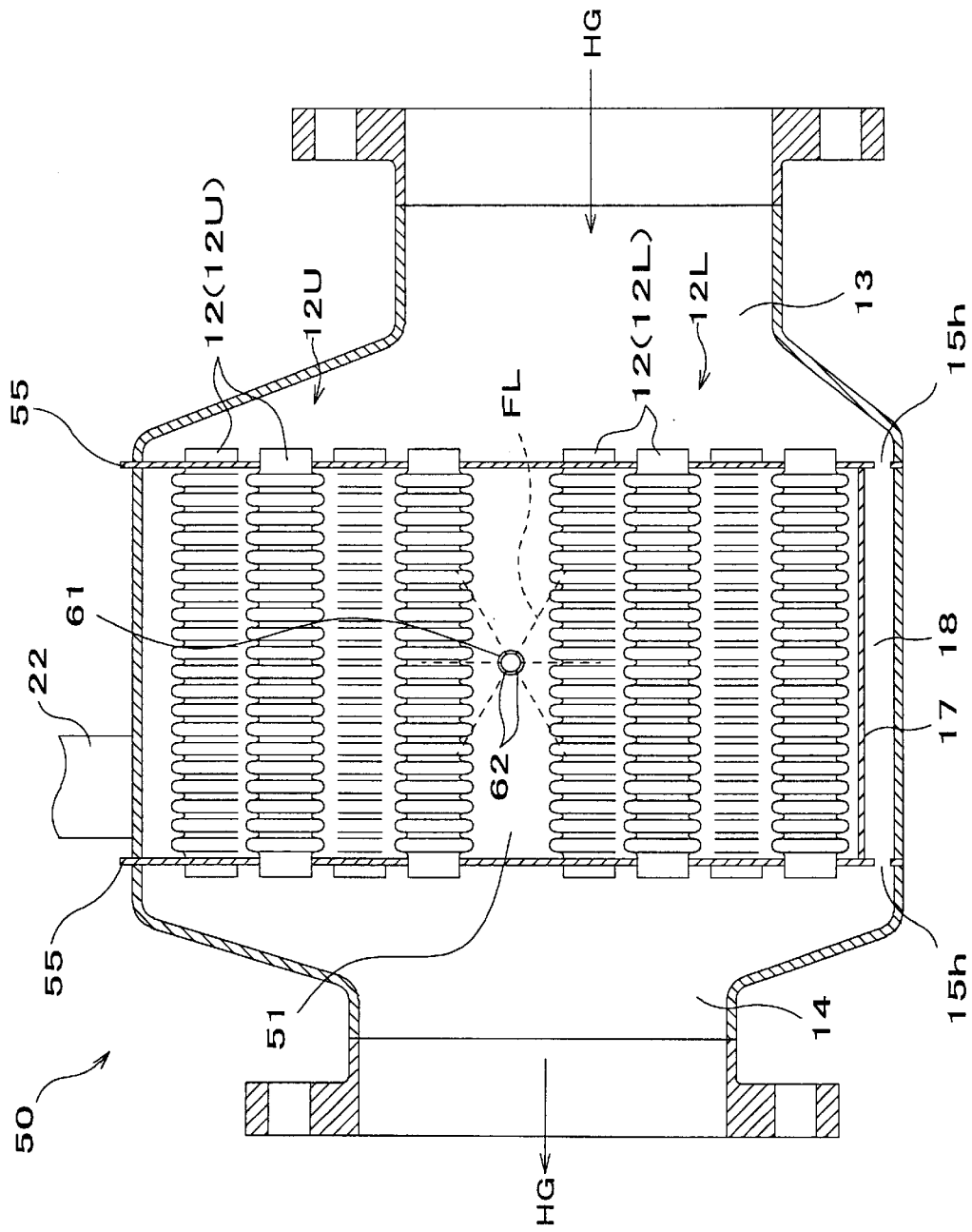
FIG. 6 is across section showing another embodiment of a fuel injector according to the present invention.

Further, at least one of injection holes is directed to the upper heating medium tubes. This case is explained on the basis of FIG. 6. Explanation of reference numerals of the same component as the one indicated in FIG. 3 is omitted.

There are provided in an evaporation chamber 51 of an evaporator 50 the upper heating medium tubes 12U to evaporate the liquid fuel FL and to superheat the fuel gas FG and the lower heating medium tubes 12L to evaporate the liquid fuel FL on separating walls 55 and 55. A fuel injection tube 61 has a plurality of injection holes 62, 61, . . . Apart of the injection holes 62, 62, . . . of the fuel injection tube 61 are directed toward the lower heating medium tubes 12L. The rest of the injection holes are directed toward the upper heating medium tubes 12U. The heat of the upper heating medium tube 12U is not only utilized to superheat the fuel gas FG but also to evaporate the liquid fuel FL the heating efficiency is improved. Further, injection holes 62 of upward direction and downward direction are alternately provided.

The location and diameters of the injection holes 42, 42, . . . provided in the fuel injection tubes 41 and 41 are optimized. Thus, the required amounts of the liquid fuel FL are injected directly to the heat concentrated part in the evaporation chamber 11. Injection of the liquid fuel FL is carried out effectively and rapidly.

For instance, as shown in FIG. 5-B, a majority number of the injection holes 42, 42, . . . of the same diameter are provided in the central part of the evaporation chamber 11, while less number of the injection holes of the same diameter are provided near the sides 16 and 16 of the evaporation chamber 11. By this composition much amounts of the liquid fuel FL are injected to the heat concentrated part of the evaporation chamber 11. FIG. 5-C indicates other embodiment of the present invention. In this case, the injection holes 42a of larger diameters than the ones of the smaller diameters of the injection holes 42b are used in the central part of the evaporation chamber 11 than the ones of the smaller ones near the sides of 16, 16 of the evaporation chamber 11. Much amounts of the liquid fuel FL are injected toward the heat concentrated parts of the evaporation chamber 11.

The embodiment of the present invention is not limited to the case of the number of the two injection tubes. In example of FIGS. 5-A, 5-B, and 5-C a single injection tube is applied. It is of course possible to apply three injection tubes in place of one or two injection tubes. Further, unlike the present embodiment in which the two fuel injection tubes 41 and 41 are provided crossing at right angle with respect to the lower heating medium tubes 12L, 12L, . . . , it is possible to have displacement location with respect to the lower heating medium tubes in vertical direction. The liquid fuel FL is injected toward different heat areas. The efficiency of heat is improved.

In the embodiment of the present invention the fuel injection tubes are extended from the sides of the evaporation chamber 11 at crossing angle with respect to the heating medium tubes but it is also possible to extend the fuel injection tubes from upper or lower part of the evaporation chamber 11. It is also possible to extend the fuel injection tubes in parallel or crossing with some inclination with respect to the heating medium tubes. In case, if the heating medium tubes should have spiral grooves or a splined shaft, it is possible to extend the fuel injection tubes along such grooves or the splined shaft. The contacting area of the liquid fuel with the heating medium tubes are increased, thus evaporation of the liquid fuel is carried out rapidly.

In case, a plurality of fuel injection tubes 41 are provided, a predetermined hole diameter of the injection holes and location thereof are selected for each fuel injection tube 41. For instance, larger amounts of the liquid fuel FL are injected from the fuel injection tube 41 provided near the inlet passage 13 and smaller amounts of the liquid fuel FL are injected from the fuel injection tubes 41 provided near the outlet passage 14. The amounts of the liquid fuel to be injected is determined according to the temperature of the surface of the lower heating medium tubes 12 L, 12L, . . . If temperature of surface at the outlet passage side is low, it is possible to control amounts of non-evaporated liquid fuel.

In the embodiment of the present invention a configuration of bellows type is applied in the heating medium tubes 12, 12, . . . It is possible to apply a distorted or twisted tube, or spiral groove configuration, or splined shaft. It is also possible to apply the heating medium gas tube having a dent and projection shape.

If ceramic coating is applied to the surface of the heating medium tubes 12, 12, thermal capacity is increased and the surface is protected. In the embodiment of the present invention each heating medium tube 12 is of single tube and has a configuration of bellows shape and the heating medium tubes 12, 12, . . . are supported by the sides 15, 15 but it is also possible to apply an approximately U shape as disclosed in prior art. The outlet passage is provided in the inlet passage side as disclosed in prior art. Design of the apparatus and location of various parts are freely adjusted.

It is also possible to provide a catalyst near the inlet part of the combustion gas HG or the inside wall of the upper heating medium tubes to keep the temperature of the surface of the upper heating medium tubes 12U, 12U, . . . than that of the lower heating medium tubes 12L, 12L, . . . Superheating temperature is increased and the fuel gas FG is further stabilized and fed into the modifier 2. It is also possible to provide a catalyst near the inlet part of the outside passage 18 or inside thereof so as to make the temperature of the sides 16 and 16 and the bottom surface than the temperature of the lower than the lower heating medium tubes 12L, 12L, . . . It is possible to prevent of a liquid reservoir on the sides 16 and 16 and the bottom surface 17 of the evaporation chamber 11.

It is also possible to place a catalyst burning apparatus 20 under the outside passage 18 to directly burn the combustion gas. It is also possible to have the sides 16 and 16 provided with the outsides passage 18 and have the surface bottom 17 of the evaporation chamber 11 provided with the catalyst burning apparatus 20 to generate the combustion gas HG. The heat generated in the preparation of the combustion gas HG is utilized in the lower part of the outside passage 18 or the bottom surface 17 of the evaporation chamber 11. The liquid reservoir of the sides 16 and 16 and bottom surface 17 of the evaporation chamber 11 is decreased.

It is also possible to use liquid state sodium as a burning gas in place of the gas containing hydrogen as a high temperature medium.

EFFECT OF THE INVENTION

The present invention offers an apparatus such that the liquid fuel is equally injected from a plurality of the injection holes provided in the fuel injection tubes extended into the evaporation chamber so as to evaporate the liquid fuel effectively and rapidly.

The fuel injection tubes are provided crossing at right angle with respect to the heating medium tubes. Thus, the liquid fuel is distributed to the areas where the temperature of the heating medium tubes is almost the same. Heat efficiency is much improved. In the case of the heating medium tubes of bellows shape wider surface of the heating medium tubes are utilized.

In the case of the design to select the diameter of the injection holes and/or the number of the injection holes, it is possible to inject the liquid fuel directly to the parts where the heat of the evaporation chamber is concentrated,. Further, providing a superheating part in the evaporation chamber and using the heating medium tubes in such a superheating part of the evaporation chamber make the composition of the apparatus simple. Thus, the thermal efficiency of the combustion gas is improved and the liquid fuel is evaporated effectively and rapidly.

What is claimed is:

1. A fuel evaporator including an evaporation chamber to prepare a fuel gas by evaporating a liquid fuel by high temperature heating medium, a fuel injector to supply the liquid fuel to the evaporation chamber, a plurality of heating medium tubes to lead the high temperature heating medium to pass through said evaporation chamber, and an exhaust duct to exhaust the fuel gas, comprising:

a fuel injection tube extending into the evaporation chamber, wherein the fuel injection tube is provided with a plurality of injection holes, and wherein the fuel injector is provided on a side wall of said evaporation chamber vertically provided in a lateral direction with respect to the heating medium tubes and wherein the fuel injection tube is located at a right angle with respect to the heating medium tubes.

2. A fuel evaporator according to claim 1, wherein the fuel injector is a device to feed the liquid fuel to the fuel injection tube by opening a valve after receiving signals issued from a control part.

* * * * *